US009201620B2

(12) United States Patent
Fujikura

(10) Patent No.: US 9,201,620 B2
(45) Date of Patent: Dec. 1, 2015

(54) DEVICE MANAGEMENT TERMINAL FOR MANAGING ELECTRONIC DEVICE

(71) Applicant: Kyocera Document Solutions Inc., Osaka (JP)

(72) Inventor: Akira Fujikura, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 14/307,720

(22) Filed: Jun. 18, 2014

(65) Prior Publication Data

US 2014/0376047 A1    Dec. 25, 2014

(30) Foreign Application Priority Data

Jun. 19, 2013    (JP) .................................. 2013-128450

(51) Int. Cl.
*H04N 1/40*    (2006.01)
*G06F 3/12*    (2006.01)
*G06K 9/00*    (2006.01)
*H04N 1/00*    (2006.01)
*H04N 1/32*    (2006.01)
*G06K 9/22*    (2006.01)

(52) U.S. Cl.
CPC ............ *G06F 3/1285* (2013.01); *G06F 3/1203* (2013.01); *G06F 3/1229* (2013.01); *G06K 9/00624* (2013.01); *G06K 9/228* (2013.01); *H04N 1/00244* (2013.01); *H04N 1/00307* (2013.01); *H04N 1/00477* (2013.01); *H04N 1/32106* (2013.01); *G06F 2211/005* (2013.01); *H04N 2201/0084* (2013.01); *H04N 2201/0094* (2013.01); *H04N 2201/3208* (2013.01); *H04N 2201/3245* (2013.01); *H04N 2201/3273* (2013.01); *H04N 2201/3278* (2013.01)

(58) Field of Classification Search
CPC .. G03G 15/502; G03G 15/55; G06F 11/0733; G06F 11/3013; G06F 11/3086; G06F 3/1204; G06F 3/1229; G06F 3/1288; G06F 2211/005; G06F 3/1203; G06F 3/1285; G06K 15/02; G06K 9/00624; G06K 9/228; H04L 67/36; H04N 1/00244; H04N 1/00307; H04N 1/00326; H04N 2201/0084; H04N 2201/0075; H04N 2201/0043; H04N 2201/0036; H04N 1/00477; H04N 1/32106; H04N 2201/0094; H04N 2201/3208; H04N 2201/3245; H04N 2201/3273; H04N 2201/3278
USPC .................................................. 358/1.1, 1.15
See application file for complete search history.

(56) References Cited

U.S. PATENT DOCUMENTS

| | | | | |
|---|---|---|---|---|
| 2012/0019858 | A1* | 1/2012 | Sato ............................ | 358/1.15 |
| 2012/0287022 | A1* | 11/2012 | Queen ........................... | 345/2.1 |
| 2013/0107318 | A1* | 5/2013 | Yamada ....................... | 358/1.15 |
| 2014/0351444 | A1* | 11/2014 | Qi et al. ........................ | 709/227 |

FOREIGN PATENT DOCUMENTS

| | | |
|---|---|---|
| JP | 2006066966 | 3/2006 |
| JP | 2012194649 | 10/2012 |
| JP | 2013235331 | 11/2013 |

* cited by examiner

*Primary Examiner* — Iriana Cruz
(74) *Attorney, Agent, or Firm* — K&L Gates LLP

(57) ABSTRACT

A device management terminal includes: an imaging section that images an electronic device placed at an installation location; a specific information acquisition section that acquires, from a server, specific information for specifying the electronic device that is being imaged; a status information acquisition section that acquires status information from the electronic device that is being imaged based on the specific information; and a display section that displays, on a screen, the acquired status information together with the electronic device that is being imaged.

8 Claims, 6 Drawing Sheets

DEVICE MANAGEMENT TERMINAL FOR MANAGING ELECTRONIC DEVICE

REFERENCE TO RELATED APPLICATIONS

This application is based upon and claims the benefit of priority from the corresponding Japanese Patent Application No. 2013-128450, filed in the Japan Patent Office on Jun. 19, 2013, the entire contents of which are incorporated herein by reference.

FIELD

The present disclosure relates to device management terminals for managing electronic devices such as image forming apparatuses.

BACKGROUND

A typical electronic device is connected to a network such as a LAN and shared by a plurality of users. Examples of such a typical electronic device include: image forming apparatuses such as printers, copying machines, and multifunction machines that can print and copy.

A typical image forming apparatus accepts an image forming job from a user and performs printing for image forming on a sheet. In this printing process, if an image forming job from another user has been already accepted, the typical image forming apparatus suspends printing related to another job until the image forming job from the other user is finished.

Thus, in some situations, the user needs to know the status information on whether the image forming apparatus can perform printing immediately or not.

To meet this need, a typical device management system uses augmented reality (AR), and displays status information on the portable terminal to an image forming apparatus that is being imaged.

The typical device management system includes an AR server that manages location information indicating the location of the image forming apparatus, identification information such as an IP address, and status information. A typical AR server transmits location information, identification information, and status information of the image forming apparatus to the portable terminal so that the portable terminal can acquire these pieces of information.

A typical portable terminal specifies an image forming apparatus that is being imaged based on location information and direction information of the portable terminal itself and location information and identification information of the image forming apparatus, and displays status information of the specified image forming apparatus for the user.

In the typical device management system, the typical AR server manages the status information of the image forming apparatus.

Since the status information of the typical image forming apparatus consecutively changes, the typical AR server needs to consecutively monitor in order to keep current the status information.

SUMMARY

A device management terminal according to an embodiment of the present disclosure includes an imaging section, a specific information acquisition section, a status information acquisition section, and a display section. The imaging section images an electronic device placed at an installation location. The specific information acquisition section acquires specific information for specifying the electronic device that is being imaged. The status information acquisition section acquires status information from the electronic device that is being imaged based on the specific information. The display section displays, on a screen, the acquired status information together with the electronic device that is being imaged.

A device management system according to an embodiment of the present disclosure includes a device management terminal and an electronic device. The device management terminal includes an imaging section, a specific information acquisition section, a status information acquisition section, and a display section. The imaging section images an electronic device placed at an installation location. The specific information acquisition section acquires specific information for specifying the electronic device that is being imaged. The status information acquisition section acquires status information from the electronic device that is being imaged based on the specific information. The display section displays, on a screen, the acquired status information together with the electronic device that is being imaged. The electronic device is placed at the installation location and is capable of transmitting the status information to the device management terminal.

A non-transitory computer-readable recording medium according to an embodiment of the present disclosure stores a device management program executable by a computer of a management terminal. The device management program includes first through fourth program codes. The first program code causes the computer to image an electronic device placed at an installation location. The second program code causes the computer to acquire specific information for specifying an electronic device that is being imaged from a server. The third program code causes the computer to acquire status information from the electronic device that is being imaged based on the specific information. The fourth program code causes the computer to display the acquired status information and the electronic device that is being imaged on a screen.

Additional features and advantages are described herein, and will be apparent from the following detailed description and the figures.

BRIEF DESCRIPTION OF THE DRAWINGS

All drawings are intended to illustrate some aspects and examples of the present disclosure. The drawings described are only schematic and are non-limiting, and are not necessarily drawn to scale.

DETAILED DESCRIPTION

Various embodiments are described below with reference to the figures. It should be understood, however, that numerous variations from the depicted arrangements and functions are possible while remaining within the scope and spirit of the claims. For instance, one or more elements may be added, removed, combined, distributed, substituted, re-positioned, re-ordered, and/or otherwise changed. Further, where this description refers to one or more functions being implemented on and/or by one or more devices, one or more machines, and/or one or more networks, it should be understood that one or more of such entities could carry out one or more of such functions by themselves or in cooperation, and may do so by application of any suitable combination of hardware, firmware, and/or software. For instance, one or more processors may execute one or more sets of programming instructions as at least part of carrying out one or more of the functions described herein.

An electronic device according to an embodiment of the present disclosure is not specifically limited, and may be an image forming apparatus that forms an image in response to an image forming instruction, for example.

An embodiment of the present disclosure will be described with reference to the drawings.

Figure 1:
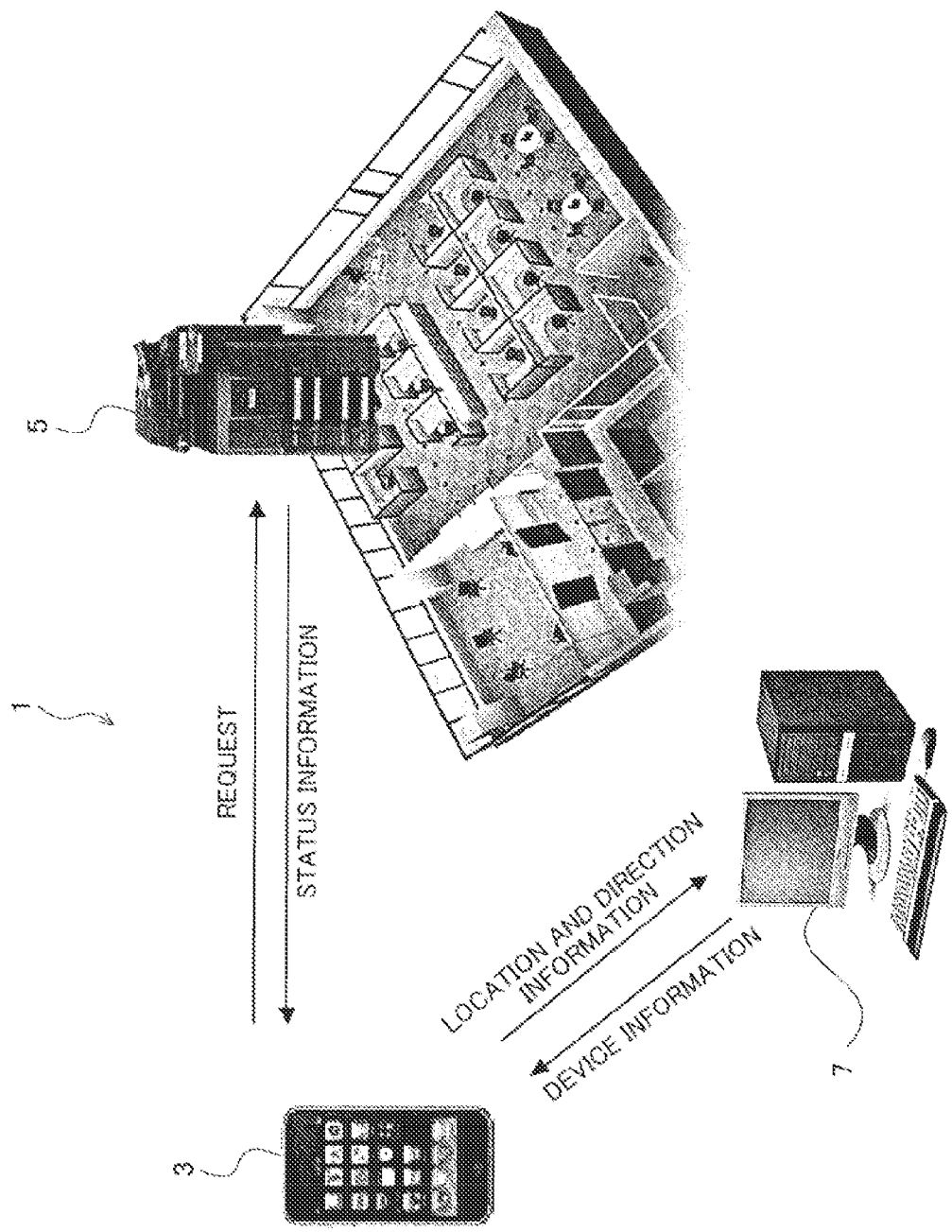
FIG. 1 schematically illustrates a device management system according an embodiment of the present disclosure.
Figure 2:
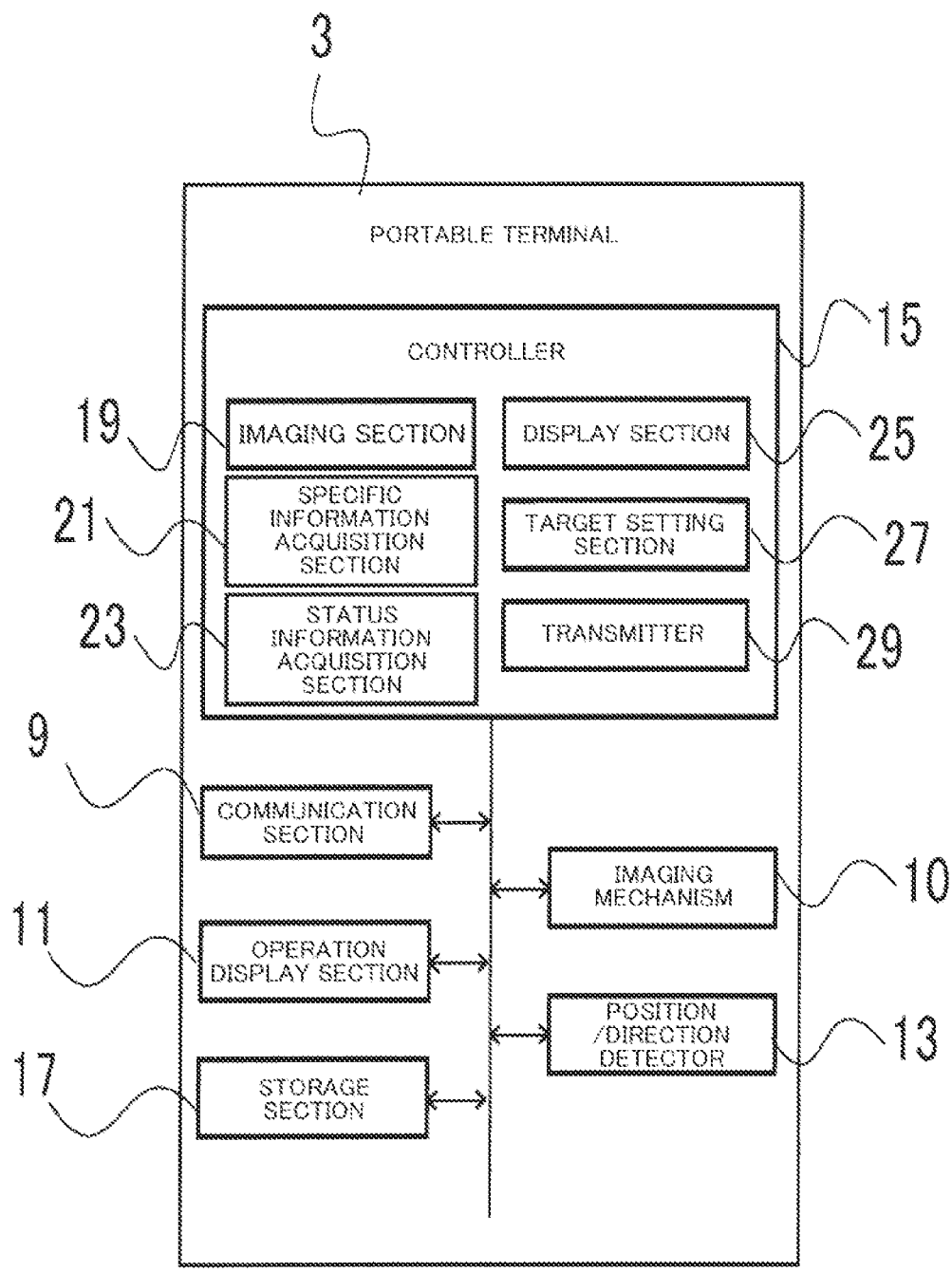
FIG. 2 shows a detailed configuration of a portable terminal of the device management system of FIG. 1.
Figure 3:
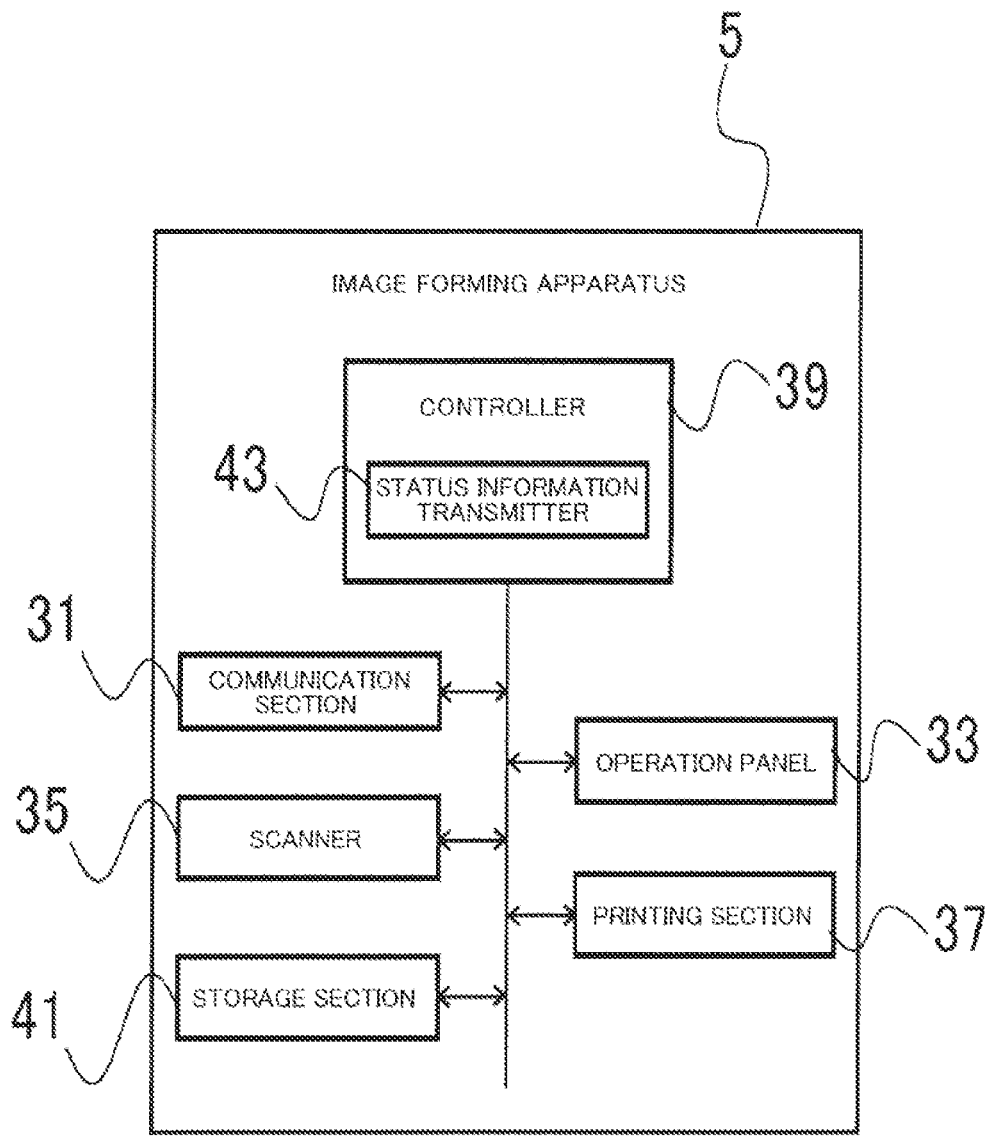
FIG. 3 shows a detailed configuration of an image forming apparatus of the device management system of FIG. 1.
Figure 4:
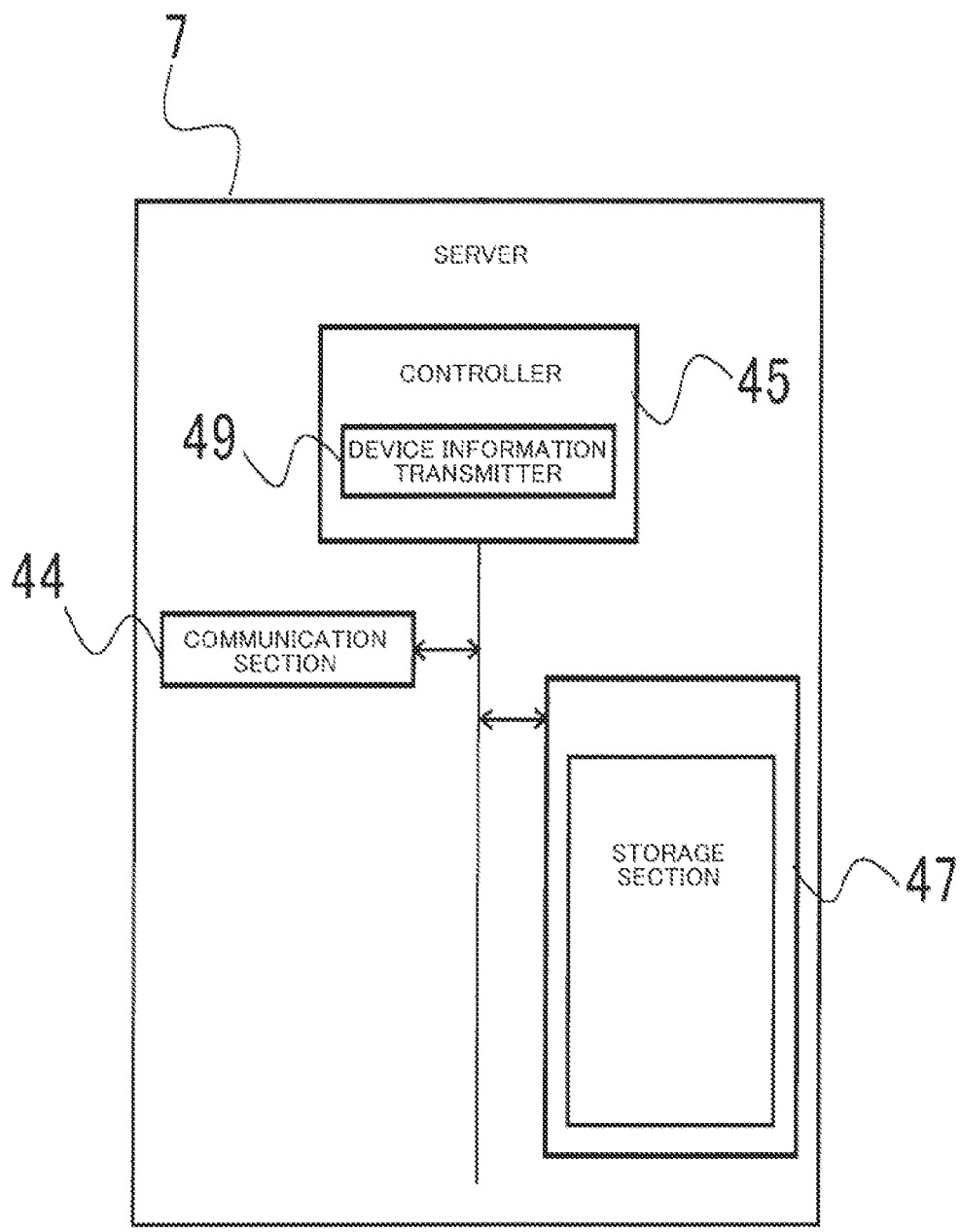
FIG. 4 shows a detailed configuration of a server of the device management system of FIG. 1.

FIG. 1 schematically illustrates a device management system according to an embodiment of the present disclosure. FIG. 2 shows a detailed configuration of a portable terminal of the device management system of FIG. 1; FIG. 3 shows a detailed configuration of an image forming apparatus of the device management system of FIG. 1; and FIG. 4 shows a detailed configuration of a server of the device management system of FIG. 1.

As shown in FIG. 1, a device management system 1 includes a portable terminal 3 that is an example of a device management terminal, an image forming apparatus 5 that is an example of an electronic device, and a server 7. The portable terminal 3, the image forming apparatus 5, and the server 7 are connected to one another via a network such as a LAN such that the portable terminal 3, the image forming apparatus 5, and the server 7 can communicate with one another.

As shown in FIG. 2, the portable terminal 3 is, for example, a portable information processing terminal such as a multi-function cell phone, and includes a communication section 9, an imaging mechanism 10, an operation display section 11, a position/direction detector 13, a controller 15, and a storage section 17.

The communication section 9 is an interface that transmits and receives data by communicating with external devices including the image forming apparatus 5 and the server 7.

The imaging mechanism 10 is, for example, a charge coupled device (CCD) camera or a complementary metal oxide semiconductor (CMOS) camera, and images the image forming apparatus 5 placed at an installation location.

The operation display section 11 includes, for example, a touch panel screen and displays reception of an operation input to the portable terminal 3 and operating conditions. The operation display section 11 displays the image forming apparatus 5 that is being imaged by the imaging mechanism 10 together with status information.

The position/direction detector 13 detects the position (coordinates) and direction of the portable terminal 3. Specifically, the position/direction detector 13 can detect the coordinates of the portable terminal 3 by means of, for example, a global positioning system (GPS), and detect the direction of the portable terminal 3 by utilizing, for example, a self-positioning technique in which a gyro sensor and an acceleration sensor are used in combination.

The controller 15 includes a processor such as a central processing unit (CPU) that executes a program to control the above-described sections.

The storage section 17 includes a read only memory (ROM) that stores programs, a random access memory (RAM) serving as a work area, and a hard disk drive (HDD) serving as an auxiliary storage device, for example.

The portable terminal 3 operates as an imaging section 19, a specific information acquisition section 21, a status information acquisition section 23, a display section 25, a target setting section 27, and/or a transmitter 29 through execution of a program in the storage section 17 by the controller 15.

The imaging section 19 implements an imaging function, and specifically, images the image forming apparatus 5 with the imaging mechanism 10.

The specific information acquisition section 21 implements a device specific information acquisition function, and specifically acquires specific information for specifying an electronic device that is being imaged by the imaging section 19. The specific information is an IP address serving as location information and direction information of the portable terminal 3 and location information and identification information of the image forming apparatus 5.

The location information and the direction information of the portable terminal 3 are acquired from the position/direction detector 13, and the location information and the IP address of the image forming apparatus 5 are acquired from the server 7. The location information and the IP address of the image forming apparatus 5 are acquired in the following manner. The specific information acquisition section 21 transmits the location information and the direction information of the portable terminal 3 to the server 7, and based on the location information and direction information, the location information and the IP address of the image forming apparatus 5 disposed near the portable terminal 3 are received. From the acquired location information and the IP address of the image forming apparatus 5 and the acquired location information and the direction information of the portable terminal 3, the image forming apparatus 5 that is being imaged can be specified.

The specific information acquisition section 21 receives the location information and the IP address of the image forming apparatus 5 as device information. The device information includes, for example, performance information in addition to the location information and the IP address. The performance information is related to various functions of the image forming apparatus 5.

The status information acquisition section 23 implements a status information acquisition function, and specifically based on the specific information, acquires status information from the image forming apparatus 5 that is being imaged. More specifically, the status information acquisition section 23 issues a request for acquiring status information to the image forming apparatus 5 that is being imaged and has been specified from the specific information. In response to this, the status information acquisition section 23 acquires the received status information. The status information is information indicating conditions (status) such as error conditions and operating conditions.

The display section 25 implements a display function, and specifically displays the acquired status information on a screen of the operation display section 25 together with the image forming apparatus 5 that is being imaged. In an embodiment, the IP address and the performance information acquired as device information of the image forming apparatus 5 are displayed together with the status information.

The target setting section 27 implements a target setting function, and specifically sets the image forming apparatus 5 that is being imaged as a control target based on a selection input of the user. Setting of the control target in an embodiment is performed by registering the image forming apparatus 5 as a target of transmission of an image forming instruction.

In this manner, the user can perform an operation while referring to the status information, the IP address, and the performance information of the image forming apparatus 5 displayed on the operation display section 25. The selection input of the image forming apparatus 5 can be performed by selecting, for example, status information and an IP address displayed on the operation display section 25.

The transmitter 29 is capable of transmitting an image forming instruction (control information) for operation control to the image forming apparatus 5 that has been set as the control target. The image forming instruction is an image forming job to be accepted as a print setting on the operation display section 25 based on performance information, and is transmitted to the image forming apparatus 5.

As shown in FIG. 3, the image forming apparatus 5 is, for example, a printer, a copying machine, or a multifunction machine that can print and copy, and includes, for example, a communication section 31, an operation panel 33, a scanner 35, a printing section 37, a controller 39, and a storage section 41.

The communication section 31 is an interface that transmits and receives data communicating between external devices including the portable terminal 3 through a network such as a wireless local area network (LAN).

The operation panel 33 includes, for example, a keyboard and a touch panel screen, and displays an operation input to the image forming apparatus 5 and operating conditions, for example.

The scanner 35 reads a document and generates image data.

The printing section 37 is a print engine that forms an image on a sheet based on image data from the scanner 35 and an image forming instruction input through the communication section 31.

The controller 39 includes, for example, a processor including a CPU and other units, and the storage section 41 includes, for example, a ROM, a RAM, and an HDD.

The image forming apparatus 5 operates as a status information transmitter 43 as a result of execution of a program in the storage section 41 by the controller 39.

The status information transmitter 43 implements the status information transmission function, and in response to an acquisition request from the status information acquisition section 23 of the portable terminal 3, transmits the status information of the image forming apparatus 5 to the status information acquisition section 23 of the portable terminal 3 such that the status information acquisition section 23 acquires the status information.

The server 7 is, for example, an information processor, and includes a communication section 44, a controller 45, and a storage section 47. The communication section 44 is an interface that transmits and receives data by performing communication with external devices including the portable terminal 3. The controller 45 includes a processor such as a CPU for controlling each section. The storage section 47 includes, for example, a ROM, a RAM, and an HDD.

As shown in FIG. 4, the server 7 stores device information of the image forming apparatus 5 in the storage section 47, and transmits the device information to the portable terminal 3. Thus, the controller 45 operates as a device information transmitter 49 as a result of execution of a program in the storage section 47.

The device information transmitter 49 implements a device information transmission function, and upon receiving location information and direction information from the specific information acquisition section 21 of the portable terminal 3, specifies an image forming apparatus 5 near the portable terminal 3, transmits location information, an IP address, performance information, and other information of the specified image forming apparatus 5 as device information to the specific information acquisition section 21 such that the specific information acquisition section 21 acquires the device information. In the device information, the location information, the IP address, the performance information, and other information are associated with one another.

Figure 5:
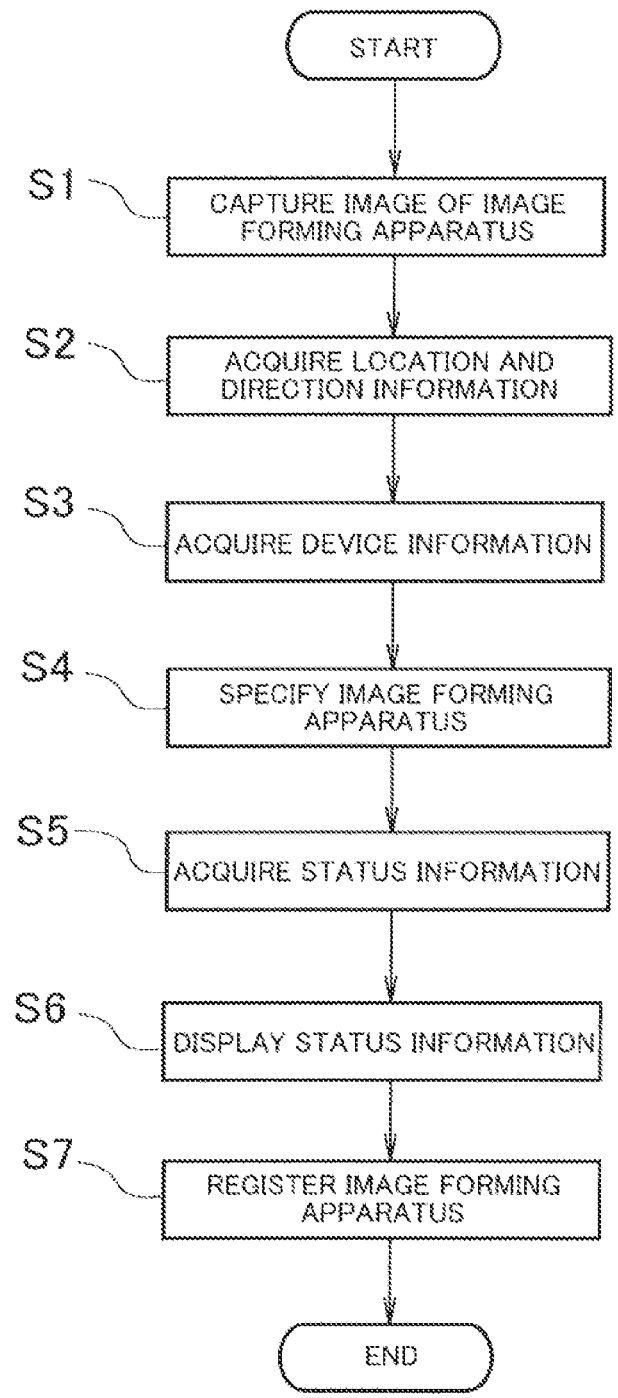
FIG. 5 shows a device management processing performed by the device management system of FIG. 2.

FIG. 5 shows a device management processing performed by the device management system of FIG. 2. The device management processing is started by execution of a program by the portable terminal 3.

In step S1, a user holding the portable terminal 3 places an image forming apparatus 5 that is at an installation location within an image-capture range of the imaging mechanism 10 of the portable terminal 3. In this manner, the imaging section 19 of the portable terminal 3 captures an image of the image forming apparatus 5 with the imaging mechanism 10. Thus, step S1 is completed, and the process proceeds to step S2.

In step S2, the specific information acquisition section 21 of the portable terminal 3 acquires location information and direction information of the portable terminal 3 from the position/direction detector 13. Thus, step S2 is completed, and the process proceeds to step S3.

In step S3, first, the specific information acquisition section 21 of the portable terminal 3 establishes a connection to the server 7. Next, the specific information acquisition section 21 transmits location information and the direction information of the specific information acquisition section 21 itself to the server 7. The server 7 specifies a neighboring image forming apparatus 5 from the location information and the direction information of the portable terminal 3 received by the device information transmitter 49. Then the server 7 transmits device information of the specified image forming apparatus 5 to the specific information acquisition section 21 of the portable terminal 3 such that the specific information acquisition section 21 acquires the device information. Thus, step S3 is completed, and the process proceeds to step S4. After completion of step S3, the specific information acquisition section 21 may sever the connection to the server 7.

In step S4, the specific information acquisition section 21 of the portable terminal 3 identifies and specifies an image forming apparatus 5 that is being imaged, from the acquired location information and direction information of the portable terminal 3 and location information and an IP address in the device information of the neighboring image forming apparatus 5. Thus, step S4 is completed, and the process proceeds to step S5.

In step S5, first, the status information acquisition section 23 of the portable terminal 3 establishes a connection to the specified image forming apparatus 5 that is being imaged, based on the IP address in the device information of the image forming apparatus 5 that is being imaged. Next, the status information acquisition section 23 transmits an acquisition request to the image forming apparatus 5 to which connection has been established. In the image forming apparatus 5, the status information transmitter 43 transmits status information of the image forming apparatus 5 itself to the status information acquisition section 23 of the portable terminal 3 such that the status information acquisition section 23 acquires the status information. Thus, step S5 is completed and the process proceeds to step S6.

Figure 6:
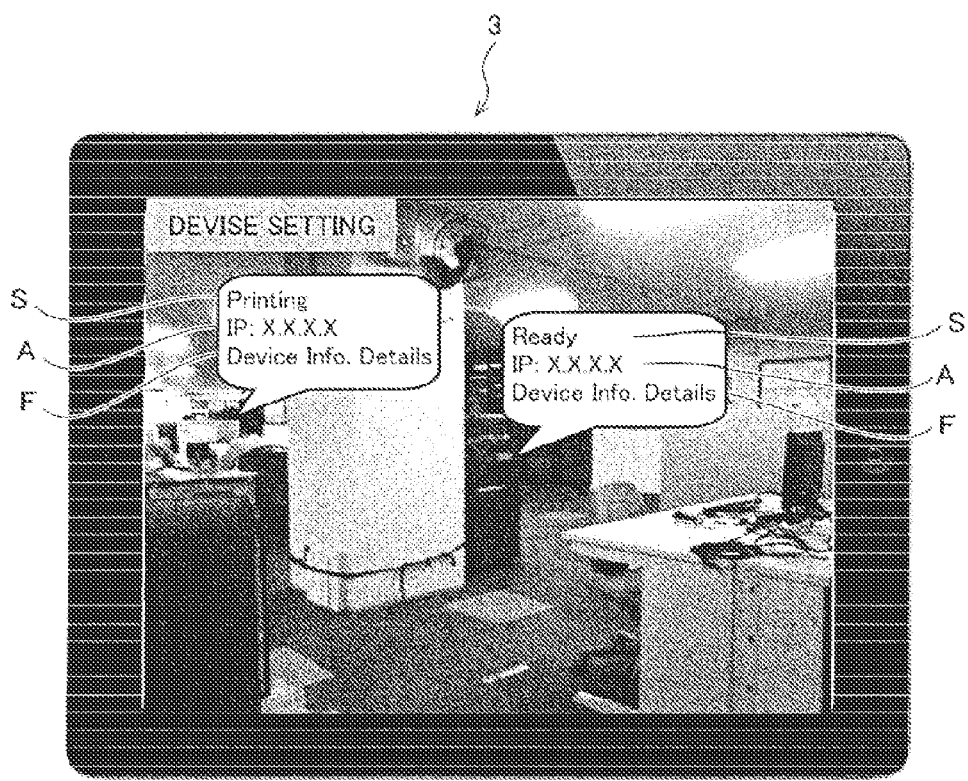
FIG. 6 shows an example of a screen on a portable terminal of the device management system of FIG. 1.

In step S6, the display section 25 of the portable terminal 3 displays the acquired status information and the IP address and the performance information in the device information on the screen of the operation display section 25, together with the image forming apparatus 5. FIG. 6 shows an example of a screen on a portable terminal.

In FIG. 6, status information S, an IP address A, and performance information F are displayed for each of two image forming apparatuses placed on a floor. The performance information in FIG. 6 is primarily displayed only as an item "Device Info. Details," and when selected, details are secondarily displayed.

In this manner, the user can intuitively and easily know the status information, the IP address, and the performance information of the image forming apparatus 5 that has been imaged on the portable terminal 3.

Thus, step S6 is completed and the process proceeds to step S7.

In step S7, the target setting section 27 of the portable terminal 3 accepts a selection input from the user to the image forming apparatus 5 that is being imaged. When the target setting section 27 accepts the selection input, the selected image forming apparatus 5 is registered as a transmission target of an image forming instruction.

At this time, the user can perform a selection input while referring to status information and performance information of the image forming apparatus 5 displayed on the operation display section 25. Accordingly, the user can determine the image forming apparatus 5 that can immediately perform printing based on the status information, and even when an image forming instruction is executed immediately after registration, the wait time can be eliminated or reduced. In addition, the user can know an image forming apparatus 5 having a desired function from performance information, and can register an image forming apparatus 5 with which an intended print result can be obtained.

The portable terminal 3 includes the imaging section 19 that can image an image forming apparatus 5 that is placed at an installation location, the specific information acquisition section 21 that acquires specific information for specifying an image forming apparatus 5 that is being imaged, the status information acquisition section 23 that acquires status information from the image forming apparatus 5 that is being imaged based on the specific information, and the display section 25 that displays the acquired status information and the image forming apparatus 5 that is being imaged on the screen.

Specifically, the portable terminal 3 establishes connection to the server 7 to transmit location information and direction information thereof to the server 7, acquires specific information for the image forming apparatus 5, and then severs the connection to the server 7. Thereafter, based on the acquired specific information, the portable terminal 3 establishes connection to the image forming apparatus 5, and acquires status information of the image forming apparatus 5.

Thus, in an embodiment, in displaying status information on the portable terminal 3 by imaging an image forming apparatus 5, status information can be directly acquired from the image forming apparatus 5. Accordingly, in an embodiment the necessity for using a server or the like for managing status information is eliminated, thereby enhancing the processing speed of the whole system.

In an embodiment, connection between the portable terminal 3 and the server 7 can be severed in a short time. Thus, the possibility of responding to requests for acquiring specific information from a plurality of portable terminals without a delay can be enhanced.

In an embodiment, real-time status information can be acquired by acquiring status information from the image forming apparatus 5. As a result, it is possible to manage status information on the portable terminal 3.

The portable terminal 3 may include a target setting section 27 that sets an image forming apparatus 5 that is being imaged as a target of an image forming instruction (a control target) depending on a selection input.

Thus, in an embodiment, it is possible to set an image forming apparatus 5 as a target of an image forming instruction while referring to status information. As a result, the convenience for the user in issuing an image forming instruction immediately after the setting can be enhanced.

In addition, in an embodiment, performance information is displayed together with status information of the image forming apparatus 5. Thus, it is possible to register an image forming apparatus 5 with which a print result intended by the user can be obtained by referring to performance information.

The device management system 1 including the portable terminal 3 may include an image forming apparatus 5 that is placed at an installation location and that can transmit status information to the portable terminal 3.

In this manner, the device management system 1 can achieve advantages of the portable terminal 3 of the embodiment.

It should be understood that various changes and modifications to the presently embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. A device management terminal comprising:
   an imaging section that images an electronic device placed at an installation location;
   a specific information acquisition section that acquires, from a server, specific information for specifying the electronic device that is being imaged;
   a status information acquisition section that acquires status information from the electronic device that is being imaged based on the specific information; and
   a display section that displays, on a screen, the acquired status information together with the electronic device that is being imaged, wherein:
   the specific information acquisition section establishes connection to the server to acquire the specific information from the server;
   the specific information acquisition section terminates the connection with the server when the specific information acquisition section has acquired the specific information from the server; and
   the status information acquisition section establishes, after terminating the connection with the server, connection to the electronic device based on the acquired specific information to acquire the status information from the electronic device.

2. The device management terminal of claim 1, comprising:
   a target setting section that sets the electronic device that is being imaged as a control target based on a selection input; and
   a transmitter that is capable of transmitting control information for operation control to the electronic device that has been set as the control target.

3. The device management terminal of claim 1, wherein the specific information acquisition section transmits location information and direction information of the device management terminal to the server, and acquires the specific information of the electronic device corresponding to the location information and the direction information from the server.

4. The device management terminal of claim 3, wherein:
the specific information acquisition section establishes connection to the server to transmit the location information and the direction information to the server; and
the specific information acquisition section terminates the connection when the specific information acquisition section has acquired the specific information from the server.

5. A device management system comprising:
a device management terminal including
an imaging section that images an electronic device placed at an installation location;
a specific information acquisition section that acquires, from a server, specific information for specifying the electronic device that is being imaged;
a status information acquisition section that acquires status information from the electronic device that is being imaged based on the specific information;
a display section that displays, on a screen, the acquired status information together with the electronic device that is being imaged; and
an electronic device that is placed at the installation location and is capable of transmitting the status information to the device management terminal, wherein:
the specific information acquisition section establishes connection to the server to acquire the specific information from the server;
the specific information acquisition section terminates the connection with the server when the specific information acquisition section has acquired the specific information from the server; and
the status information acquisition section establishes, after terminating the connection with the server, connection to the electronic device based on the acquired specific information to acquire the status information from the electronic device.

6. The device management system of claim 5, wherein:
the electronic device is an image forming apparatus that forms an image based on an image forming instruction; and
a target setting section of the device management terminal registers an image forming apparatus that has been set as the control target as a target to which the image forming instruction is to be transmitted.

7. A non-transitory computer-readable recording medium storing a device management program executable by a computer of a management terminal, the device management program including:
a first program code that causes the computer to image an electronic device placed at an installation location;
a second program code that causes the computer to acquire specific information for specifying the electronic device that is being imaged from a server;
a third program code that causes the computer to acquire status information from the electronic device that is being imaged based on the specific information;
a fourth program code that causes the computer to display, on a screen, the acquired status information together with the electronic device that is being imaged;
a fifth program code that causes the computer to establish connection to the server to acquire the specific information from the server;
a sixth program code that causes the computer to terminate the connection with the server when the specific information has been acquired from the server; and
a seventh program code that causes the computer to establish, after terminating the connection with the server, connection to the electronic device based on the acquired specific information to acquire the status information from the electronic device.

8. The non-transitory computer-readable recording medium of claim 7, wherein the device management program further includes:
an eighth program code that causes the computer to set the electronic device that is being imaged as a control target based on a selection input; and
a ninth program code that allows the computer to transmit control information for operation control to the electronic device that has been set as the control target.

* * * * *